United States Patent
Ho et al.

(10) Patent No.: US 11,511,784 B2
(45) Date of Patent: Nov. 29, 2022

(54) KNOCK-DOWN HAMPER

(71) Applicant: Seville Classics Inc., Torrance, CA (US)

(72) Inventors: Edwin Ho, Irvine, CA (US); Wen-Dung Chang, Yilan County (TW)

(73) Assignee: Seville Classics, Inc, Torrance, CA (US)

( * ) Notice: Subject to any disclaimer, the term of this patent is extended or adjusted under 35 U.S.C. 154(b) by 162 days.

(21) Appl. No.: 17/128,156

(22) Filed: Dec. 20, 2020

(65) Prior Publication Data
US 2022/0194452 A1    Jun. 23, 2022

(51) Int. Cl.
*B62B 3/02* (2006.01)
*B62B 3/00* (2006.01)
*D06F 95/00* (2006.01)
*B62B 5/06* (2006.01)

(52) U.S. Cl.
CPC .............. *B62B 3/025* (2013.01); *B62B 3/003* (2013.01); *B62B 5/061* (2013.01); *D06F 95/004* (2013.01); *B62B 2202/66* (2013.01)

(58) Field of Classification Search
CPC ........... B62B 3/025; B62B 3/02; B62B 3/002; B62B 3/027; B62B 3/003; B62B 2202/66; D06F 95/004; D06F 95/002
USPC ....................................................... 280/651
See application file for complete search history.

(56) References Cited

U.S. PATENT DOCUMENTS

| | | | | |
|---|---|---|---|---|
| 3,191,959 | A * | 6/1965 | Heimbruch | B62B 3/025 280/33.991 |
| 4,346,906 | A * | 8/1982 | Thorpe | B62B 3/186 280/33.996 |
| 5,289,937 | A * | 3/1994 | Boots | B65D 88/1631 220/666 |
| 5,480,187 | A * | 1/1996 | Binning | B62B 3/02 296/50 |
| 5,873,204 | A * | 2/1999 | Gehn | B62B 3/004 49/503 |
| 8,100,280 | B1 * | 1/2012 | Hernandez | D06F 95/002 220/9.4 |
| 9,428,205 | B2 * | 8/2016 | Jackson | B62B 3/004 |
| 9,969,227 | B1 * | 5/2018 | McNeave | B62B 3/007 |
| 10,351,155 | B1 * | 7/2019 | Thuma | B62B 3/002 |
| 10,421,573 | B2 * | 9/2019 | Ribbe | B65B 67/1211 |
| 10,822,009 | B2 * | 11/2020 | Shimizu | B62B 3/025 |
| 10,988,153 | B1 * | 4/2021 | Horowitz | B62B 7/008 |
| 11,091,183 | B2 * | 8/2021 | Wu | B62B 3/007 |

(Continued)

*Primary Examiner* — Nkeisha Smith
(74) *Attorney, Agent, or Firm* — Raymond Sun (57) ABSTRACT

A hamper has a fabric bag, and a supporting frame assembly that has a foldable wall assembly, a base and a top frame. The foldable wall assembly has a rear frame, a left frame a right frame. The base has a rear side that is pivotally connected with the bottom side of the rear frame, with the left and right sides of the base removably coupled to the bottom sides of the left frame and the right frame, respectively. The top frame has a rear side that is removably coupled to the top side of the rear frame, with the left and right sides of the top frame removably coupled to the top sides of the left frame and the right frame, respectively. The fabric bag has four side walls, each side wall having a lip extending around the upper edge of each side wall, and four vertical corner sleeve pockets.

12 Claims, 11 Drawing Sheets

(56) References Cited

U.S. PATENT DOCUMENTS 11,225,277 B1 * 1/2022 Sun .................... B62B 5/061
11,299,186 B2 * 4/2022 Shimizu ................ B62B 3/003

* cited by examiner

KNOCK-DOWN HAMPER

BACKGROUND OF THE INVENTION

1. Field of the Invention

The present invention relates to a hamper that can be quickly and conveniently assembled for use.

2. Description of the Prior Art

Portable hampers for use in holding and carrying laundry has become an important part of modern life, where it is necessary to carry a load of dirty laundry from a bathroom to a washing machine. This need becomes more acute for people living in accommodations, such as apartments and dormitories, where they do not have immediate access to a washing machine and need to haul the load of laundry for a certain distance to the washing machine.

Collapsible hampers have been used by many college students and apartment dwellers because they are easy to use, and can be easily and quickly folded into a smaller size. An example of a collapsible hamper is shown and described in U.S. Pat. No. 7,066,647. Unfortunately, these collapsible hampers are not capable of handling the weight of heavy laundry, so they are not durable and need to be replaced frequently. In addition, where the laundry needs to be carried for long distances (such as down long hallways in a dormitory), these collapsible hampers are not feasible as they do not have rollers and the user must physically carry the hamper.

As a result, larger hampers that have rollers or wheels are more feasible alternatives for transporting loads of dirty laundry. The biggest problem with larger hampers that have rollers is that they occupy a lot of space when assembled. With shelf-space at retail stores and outlets being at a premium, it is simply not feasible for separate and individual assembled rolling hampers to be placed in stores for sale.

Thus, there still remains a need for a rolling hamper that occupies minimal shelf-space or store-space, which can be conveniently and quickly assembled for use, and which provides a stable and solid construction for extended durability.

SUMMARY OF THE DISCLOSURE

The present invention provides a knock-down hamper that can be packaged in a small and slim packaging or box, which can be conveniently and quickly assembled for use, and which provides a stable and solid construction for extended durability.

In order to accomplish the objects of the present invention, the present invention provides a hamper and a method of assembling the hamper. The hamper has a fabric bag, and a supporting frame assembly that includes a foldable wall assembly, a base and a top frame. The foldable wall assembly has a rear frame having a top side, a bottom side, a left side and a right side, a left extension having a vertical bar, a top bar and a bottom bar both connecting the vertical bar of the left extension and the left side of the rear frame, and a right extension having a vertical bar, a top bar and a bottom bar both connecting the vertical bar of the right extension and the right side of the rear frame. The foldable wall assembly also has a left frame having a rear side that is pivotably connected to the vertical bar of the left extension, and a right frame having a rear side that is pivotably connected to the vertical bar of the right extension. The base has a rear side that is pivotally connected with the bottom side of the rear frame, with the left and right sides of the base removably coupled to the bottom sides of the left frame and the right frame, respectively. The top frame has a rear side that is removably coupled to the top side of the rear frame, with the left and right sides of the top frame removably coupled to the top sides of the left frame and the right frame, respectively. The fabric bag has four side walls, each side wall having an upper edge, a lip extending around the upper edge of each side wall, and four vertical corner sleeve pockets. A first vertical corner sleeve pocket is wrapped around the front side of the right frame, a second vertical corner sleeve pocket is wrapped around the front side of the left frame, a third vertical corner sleeve pocket is wrapped around at least the left side of the rear frame, and a fourth vertical corner sleeve pocket is wrapped around at least the right side of the rear frame. The lip is folded around at least the front, left, right and rear sides of the top frame and secured to portions of the side walls.

According to one embodiment of the present invention, the left extension and the right extension have different widths, and the left frame and the right frame have different widths, with the combined width of the left extension and the left frame being the same as the combined width of the right extension and the right frame.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

FIGS. 1-11 illustrate a knock-down hamper 10 according to the present invention. Referring to FIGS. 1-4, the hamper 10 has a fabric bag 12 and a supporting frame assembly 14. The supporting frame assembly 14 has a base 16, a foldable wall assembly 20 and a top frame 18.

Figure 2:
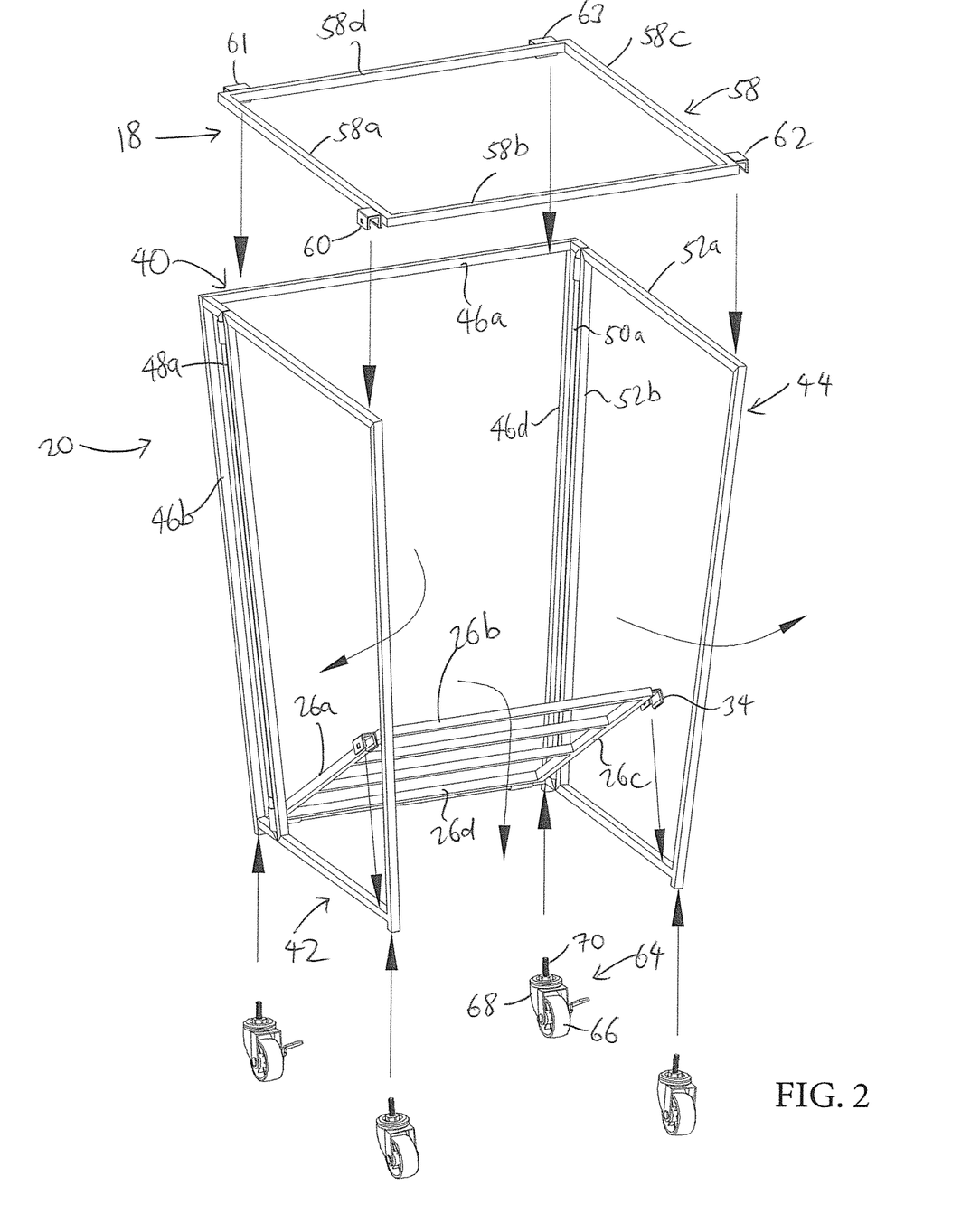
FIG. 2 is an exploded perspective view of the supporting frame assembly for the hamper of FIG. 1.
Figures 3, 12:
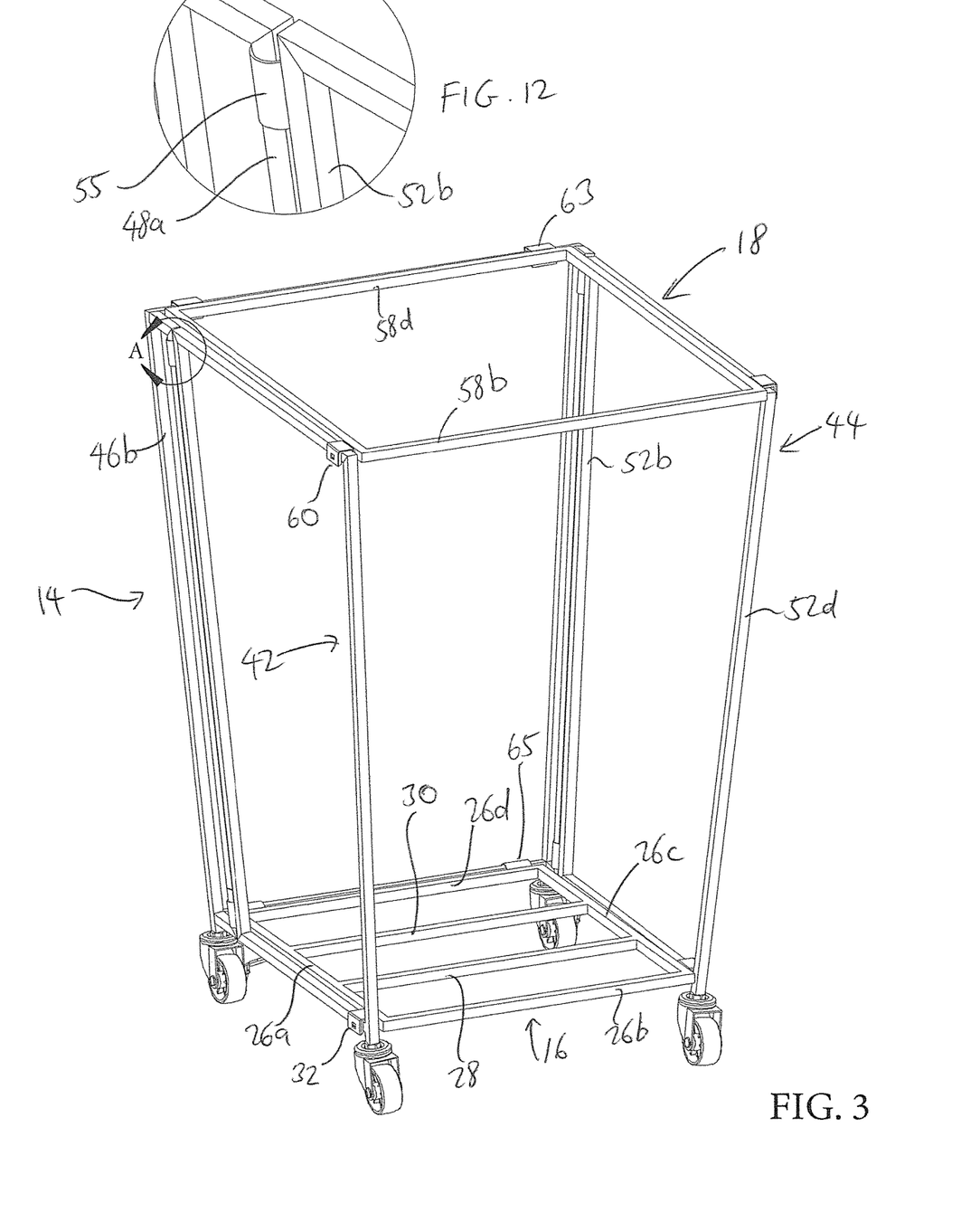
FIG. 3 is a perspective view of the assembled supporting frame assembly of FIG. 2 shown in a deployed position.
FIG. 12 is an enlarged view of the area A in FIG. 3.
Figure 8:
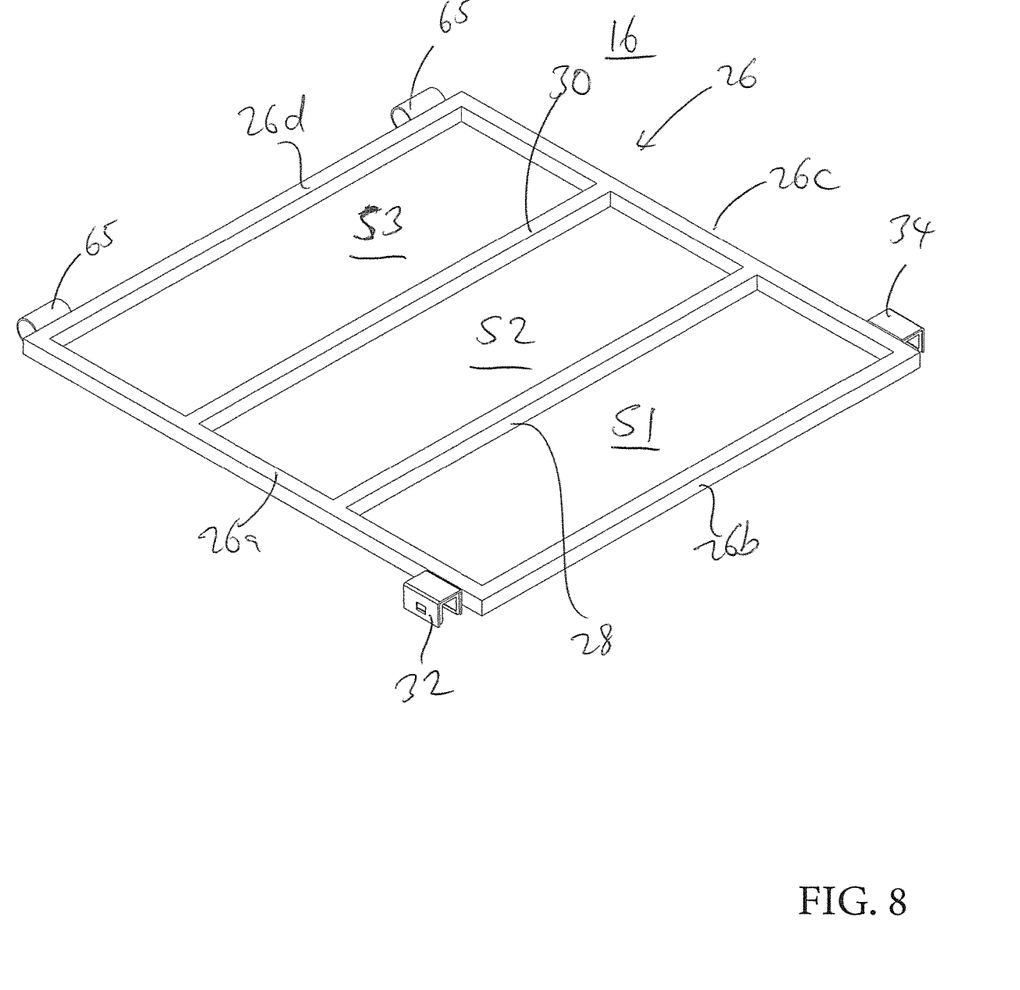
FIG. 8 is a perspective view of the base of the supporting frame assembly.

Referring to FIGS. 2, 3 and 8, the base 16 includes a base frame that has a peripheral frame 26 which can have four sides 26a, 26b, 26c and 26d. Two long bars 28 and 30 have their opposite ends connected to opposing sides 26a and 26c, and are parallel with the other two sides 26b and 26d. A first lateral space S1 is defined between the bar 28 and the side 26b, a second lateral space S2 between the bars 28 and 30, and a third lateral space S3 between the other bar 30 and the side 26d. A U-shaped locking mechanism 32 is provided at the outer surface of the side 26a adjacent the corner with the front side 26b, and another U-shaped locking mechanism 34 is provided at the outer surface of the side 26c adjacent the corner with the front side 26b.

Figure 9:
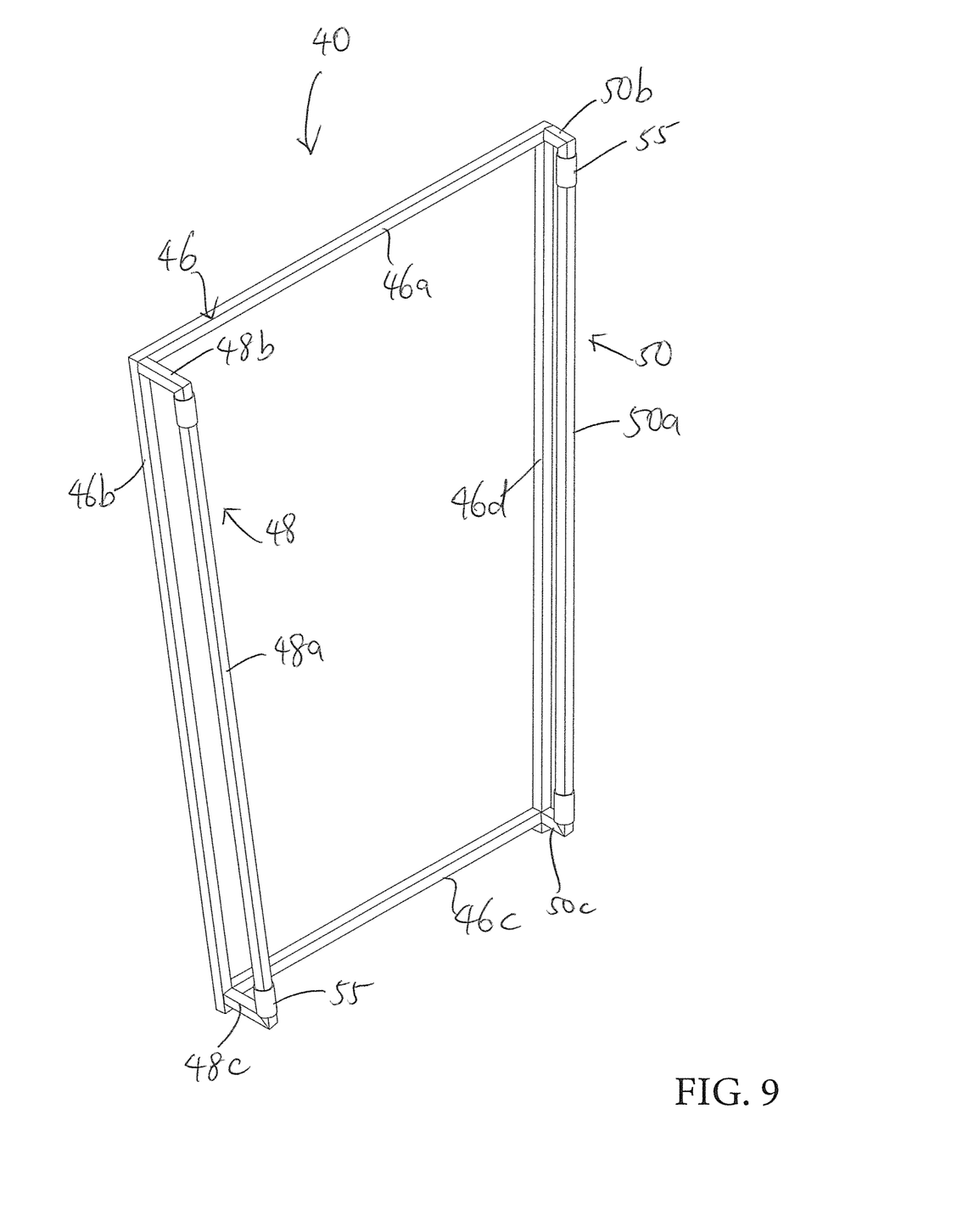
FIG. 9 is a perspective view of the rear frame of the supporting frame assembly.

The foldable wall assembly 20 has a rear frame 40, a left frame 42 and a right frame 44. Referring to FIGS. 2, 3 and 9, the rear frame 40 has a generally rectangular rear frame member 46 that has a top side 46a, a left side 46b, a bottom side 46c and a right side 46d. A left extension 48 has a vertical bar 48a connected to the left side 46b by a top bar 48b and a bottom bar 48c. Similarly, a right extension 50 has a vertical bar 50a connected to the right side 46d by a top bar 50b and a bottom bar 50c.

Figure 10:
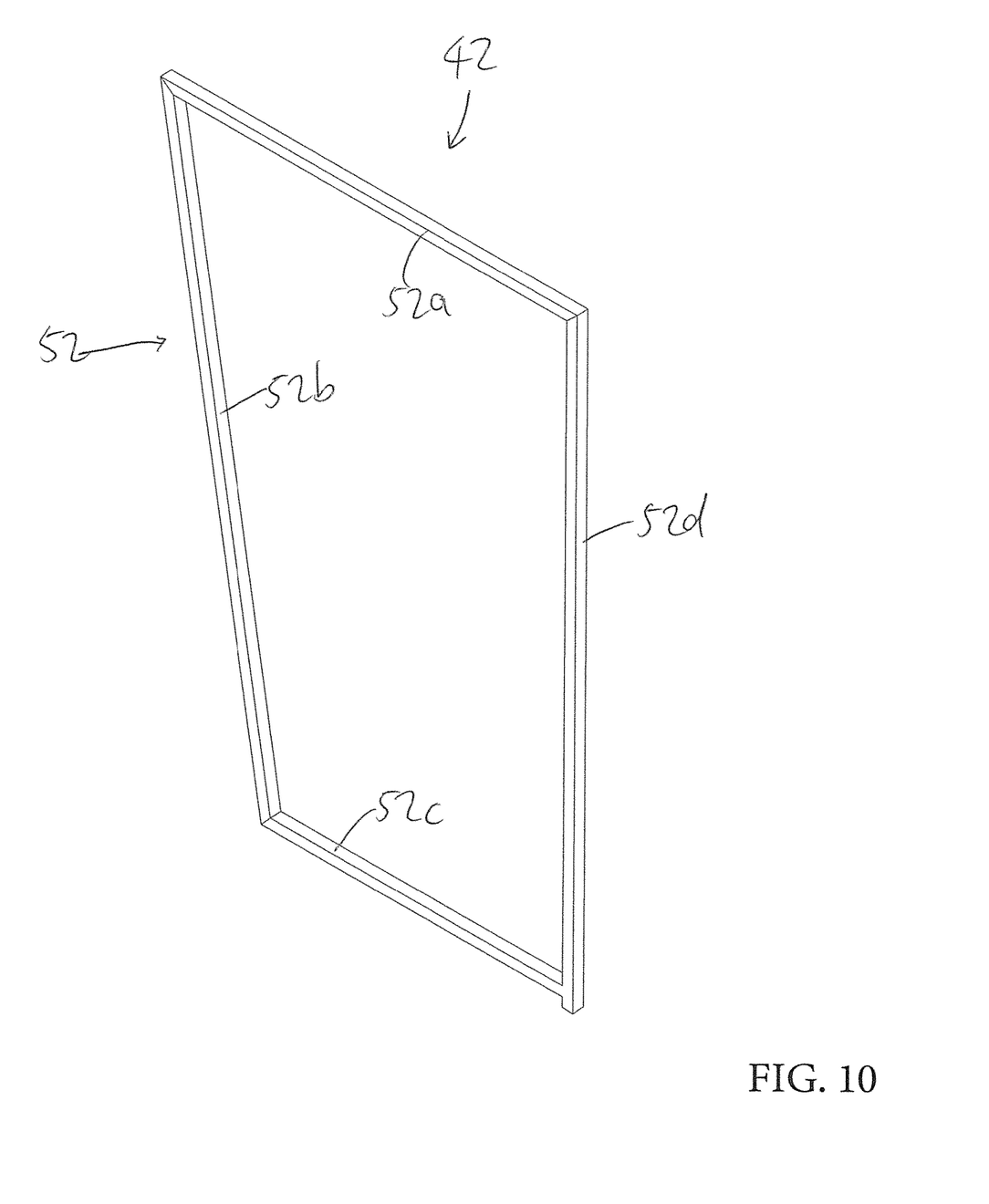
FIG. 10 is a perspective view of the left frame of the supporting frame assembly.

FIG. 10 shows the left frame 42, which has a generally rectangular frame member 52 that has a top side 52a, a rear side 52b, a bottom side 52c and a front side 52d. The right frame 44 is identical to the left frame 42 other than the different widths as described below. Connecting collars 55 are provided along the lengths of the rear sides 52b so that pairs of collars 55 retain each vertical bar 48a and 50a for pivoting motion inside the collars 55. As shown in FIGS. 2-3 and 12, the rear sides 52b of the left frame 42 and the right frame 44 are pivotably connected to the vertical bar 48a and the vertical bar 50a, respectively, of the left extension 48 and the right extension 50, respectively, via the pairs of collars 55.

The rear side 26d of the base 16 is pivotably connected to the bottom side 46c of the rear frame 40 via another pair of connecting collars 65 which are secured to the rear side 26d and which retain the bottom side 46c for pivoting motion inside the collars 65. See FIGS. 3 and 8. Thus, as shown in FIGS. 2-3, the base 16 can be pivoted up and down, from a deployed position (see FIG. 3) where the U-shaped locking mechanisms 32 and 34 receive portions of the bottom sides 52c of the left frame 42 and right frame 44, respectively, to a storage position (see FIG. 11) where the base 16 is parallel to, and aligned against, the rear frame 40. In addition, the left frame 42 and the right frame 44 can be pivoted from a deployed position (see FIG. 3) where the left and right frames 42 and 44 are opened outwardly away from the rear frame 40, to a storage position (see FIG. 11) where the left and right frames 42 and 44 are parallel to, and aligned against, the rear frame 40.

The top frame 18 includes a peripheral frame 58 which can have four sides 58a, 58b, 58c and 58d. A first U-shaped locking mechanism 60 is provided at the outer surface of the left side 58a adjacent the corner with the front side 58b, and a second U-shaped locking mechanism 62 is provided at the outer surface of the right side 58c adjacent the corner with the front side 58b. A third U-shaped locking mechanism 61 is provided at the outer surface of the rear side 58d adjacent the corner with the left side 58a, and a fourth U-shaped locking mechanism 63 is provided at the outer surface of the rear side 58d adjacent the corner with the right side 58c.

A conventional roller caster assembly 64 is secured to the bottom of each of the front sides 52d of the left and right frames 42 and 44, and the bottom of each of the left side 46b and the right side 46d of the rear frame 40. Each caster assembly 64 has a roller 66 provided in a roller housing 68, and a threaded screw 70 extends upwardly from the roller housing 68 into the bottom of each of the front sides 52d of the left and right frames 42 and 44, and the bottom of each of the left side 46b and the right side 46d of the rear frame 40.

When the supporting frame assembly 14 is deployed for use, the left frame 42 and the right frame 44 are opened outwardly away from the rear frame 40, the base 16 is pivoted downwardly so that the U-shaped locking mechanisms 32 and 34 receive portions of the bottom sides 52c of the left frame 42 and right frame 44, respectively, and then the top frame 18 is placed on top of the rear frame 40, left frame 42 and right frame 44 by securing portions of the top side 52a of the left and right frames 42 and 44 inside the U-shaped locking mechanisms 60 and 62 of the top frame 18, and portions of the top side 46a of the rear frame 40 inside the U-shaped locking mechanisms 61 and 63 of the top frame 18. This deployed position is shown in FIG. 3. In this deployed position, the various U-shaped locking mechanisms 32, 34, 60, 61, 62 and 63 secure the various sides in a stable position for use.

Figure 11:
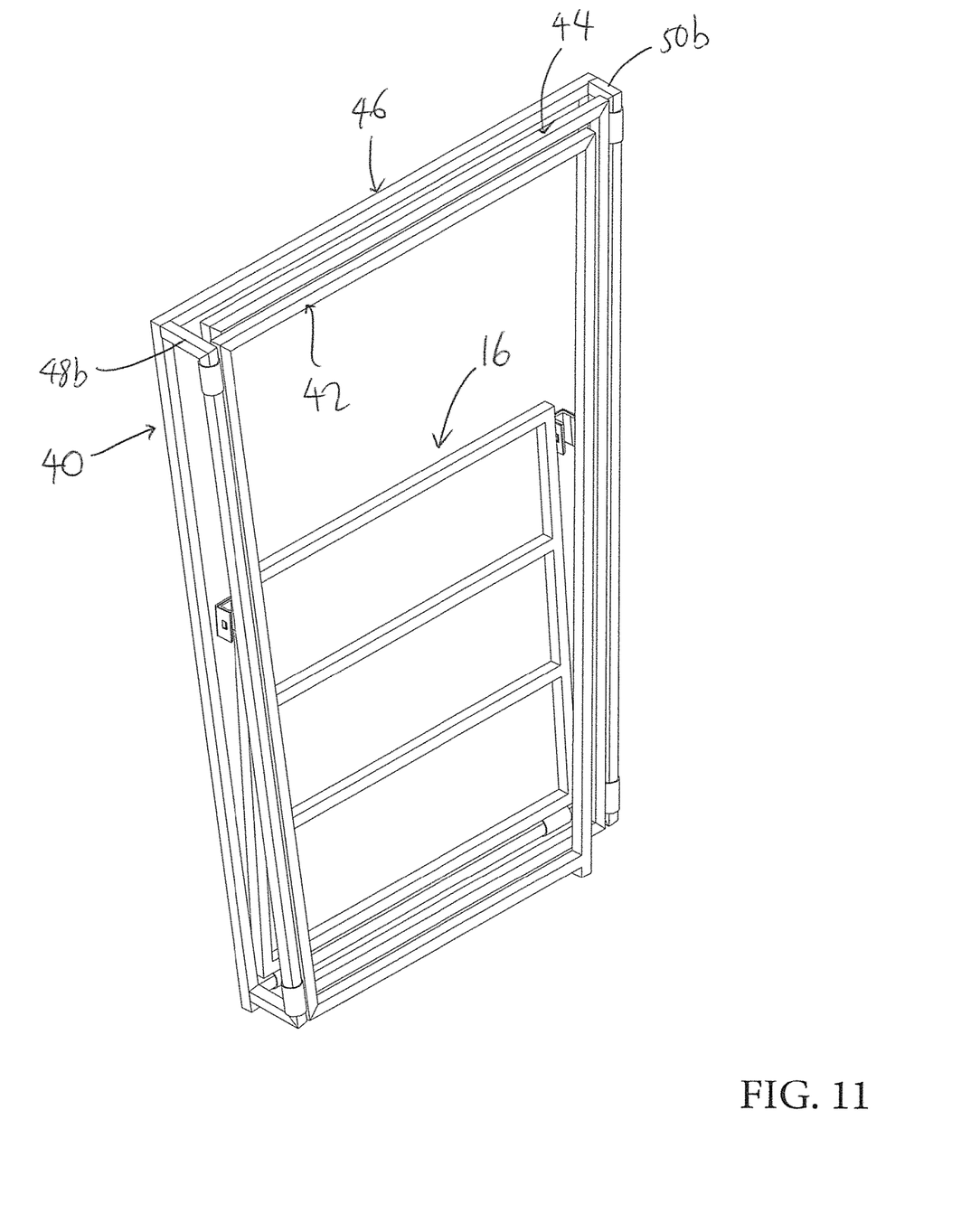
FIG. 11 is a perspective view of the supporting frame assembly of FIG. 2 shown in a storage position.

When the supporting frame assembly 14 is to be stored, the caster assemblies 64 can be first removed, or can remain secured to the supporting frame assembly 14. Next, the top frame 18 is removed, the base 16 is lifted up and pivoted towards the rear frame 40, and the left and right frames 42 and 44 are folded towards the rear frame 40. As shown in FIG. 11, the base 16 is positioned between the rear frame 40 and the left and right frames 42 and 44 in this storage position. In this regard, the left and right extensions 48 and 50 provide the needed space clearance to receive the base 16 so that the rear frame 40, the left and right extensions 48 and 50, and the left and right frames 42 and 44, together define an enclosed space for receiving the base 16. The left extension 48 can be wider than the right extension 50 (or vice versa) so that the right frame 44 can be folded or pivoted towards the base 16 first, and then the left frame 42 folded or pivoted on to the right frame 44 (or vice versa). This is best shown in FIG. 9, where the bars 48b and 48c are longer than the bars 50b and 50c. Similarly, the left frame 42 and the right frame 44 can have different widths, depending on the widths of the corresponding left extension 48 and right extension 50, so that the combined width of the left extension 48 and left frame 42 is the same as the combined width of the right extension 50 and the right frame 44. As used herein, "width" shall mean the length of the top and bottom sides of the extensions 48 and 50, and the left and right frames 42 and 44. Finally, the use of the U-shaped locking mechanisms 32, 34, 60, 61, 62 and 63 makes it easy to secure, and detach, the various connections.

Figure 4:
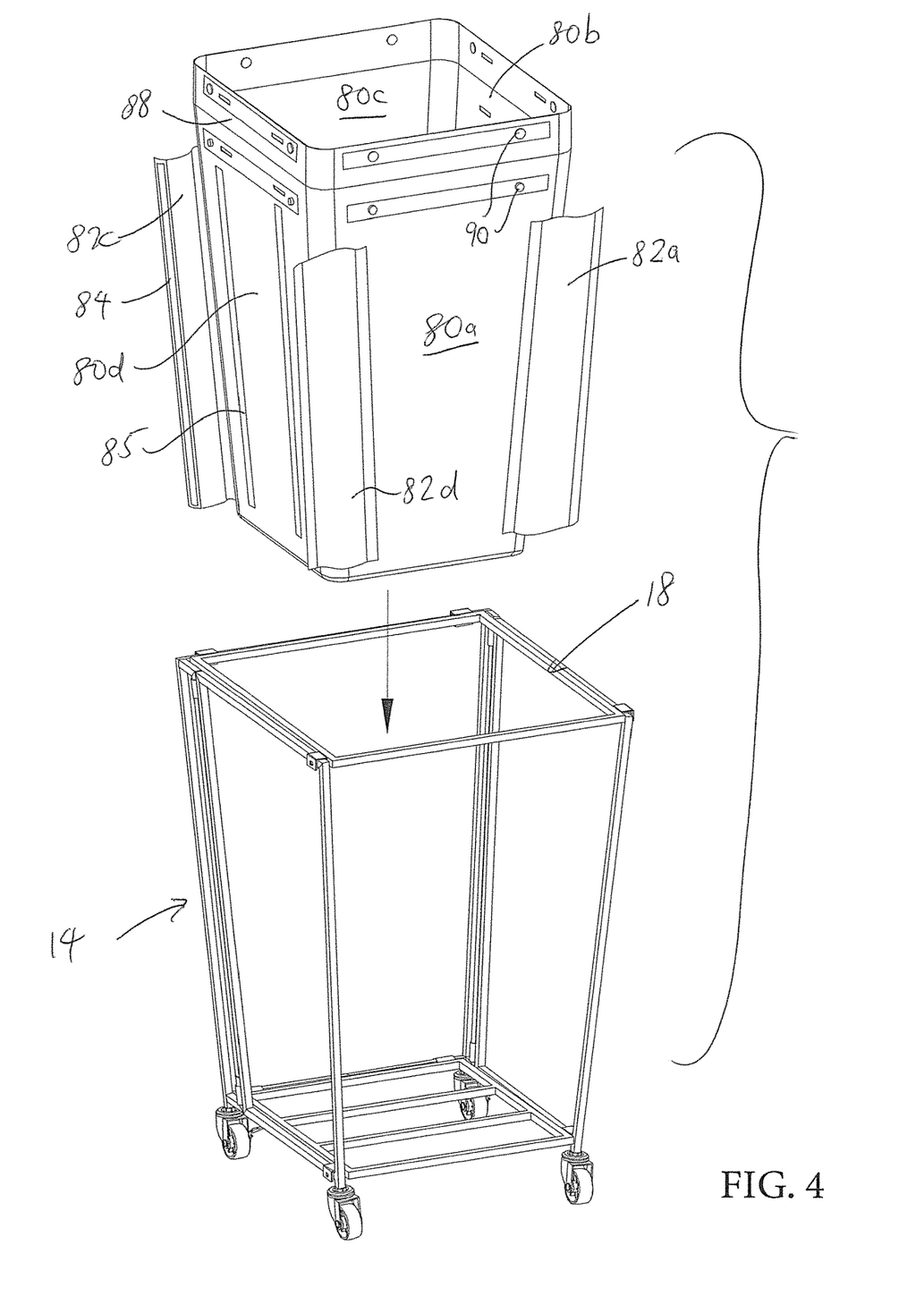
FIG. 4 is an exploded perspective view illustrating how the fabric body is inserted into the supporting frame assembly for the hamper of FIG. 1.
Figure 5:
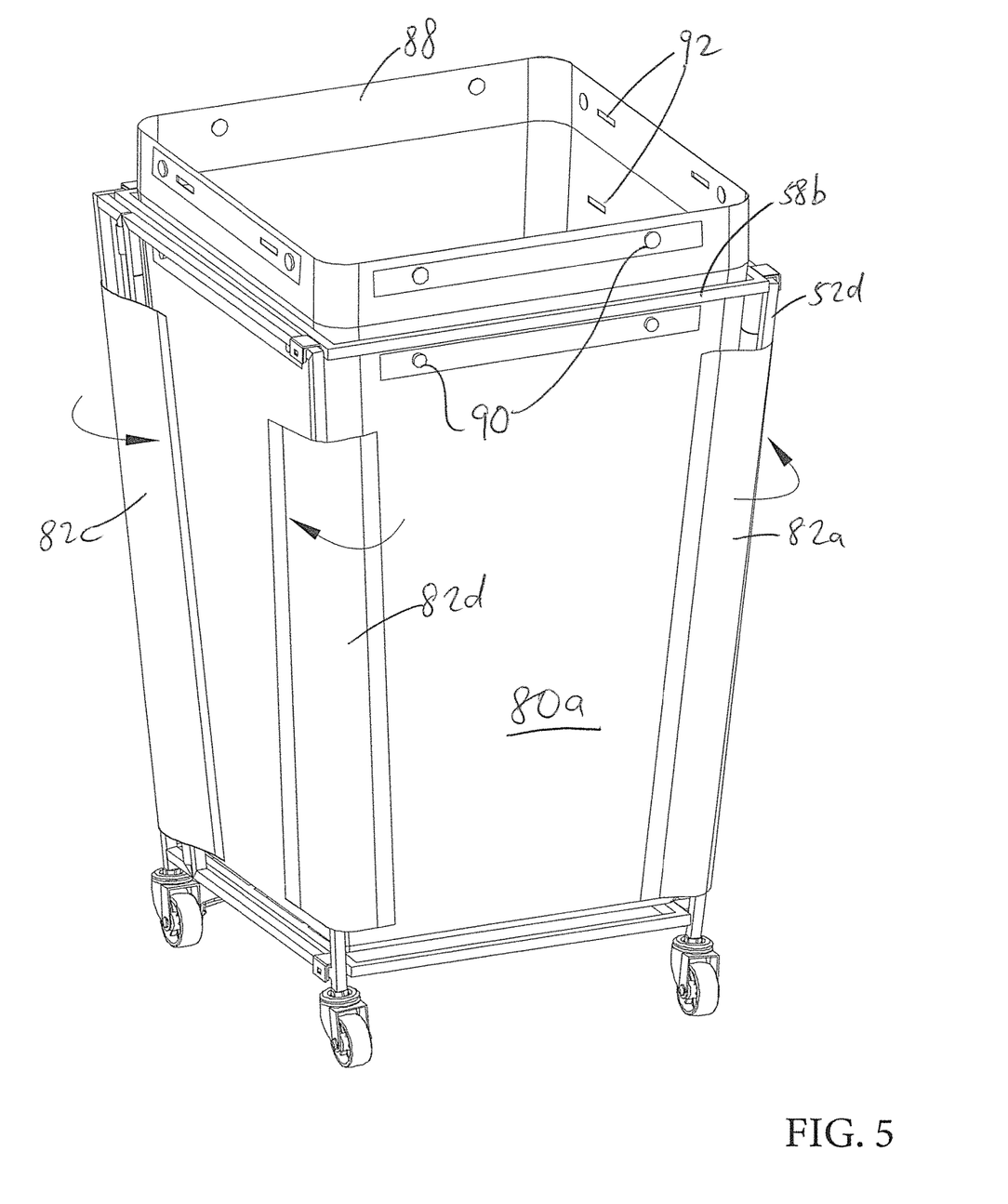
FIGS. 5-6 are perspective views illustrating how the fabric body is fitted on, and secured to, the supporting frame assembly of the hamper of FIG. 1.
Figure 6:
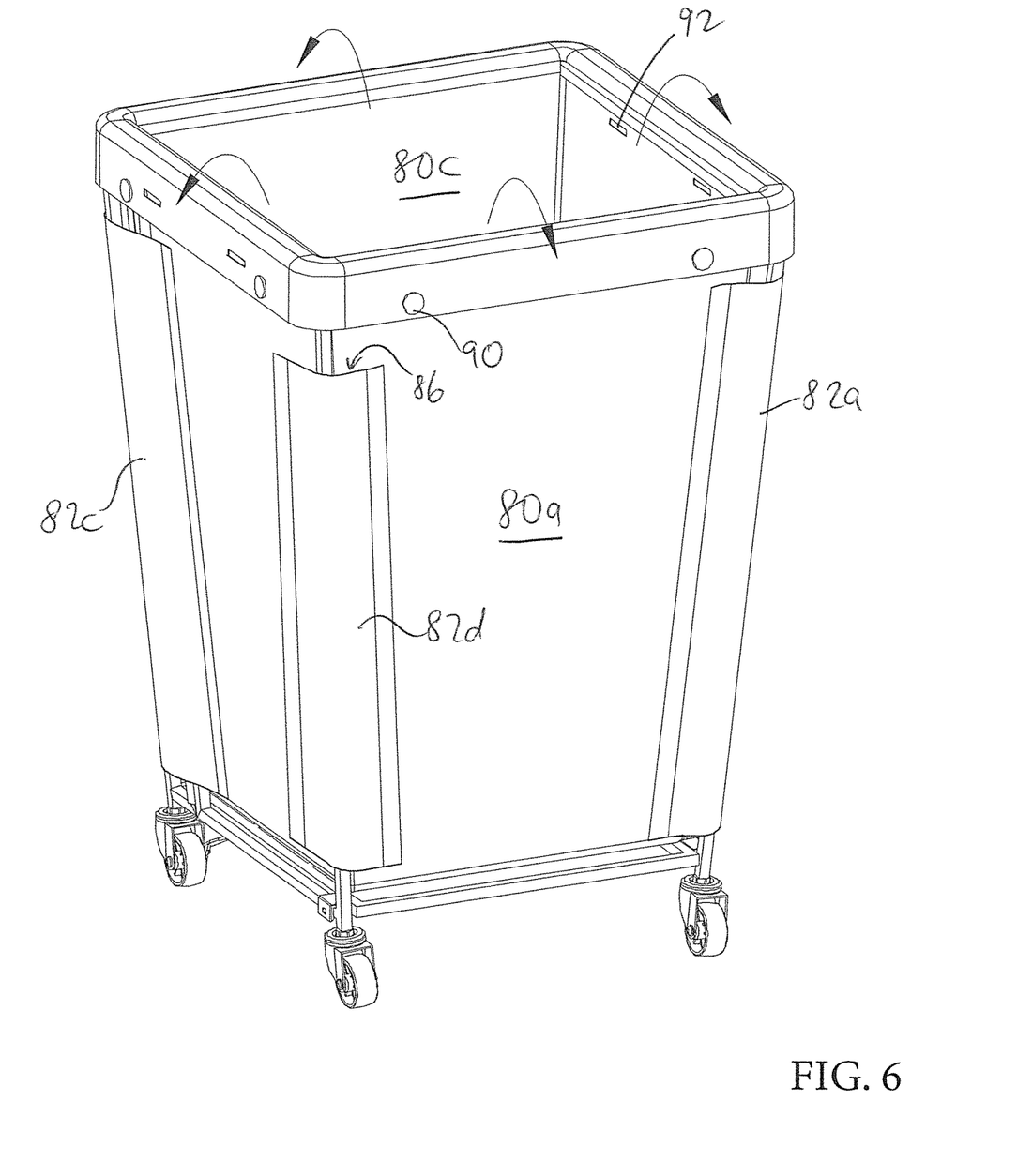

Referring to FIGS. 4-6, the fabric bag 12 has four side walls 80a, 80b, 80c and 80d, and four vertical corner sleeve pockets 82a, 82b, 82c and 82d, each having one side secured (e.g., via stitching) to a separate corner of the fabric bag 12. Each corner sleeve pocket 82a, 82b, 82c and 82d defines a vertical elongated channel 86 between the corner sleeve pocket 82a, 82b, 82c and 82d and the fabric bag 12. Each corner sleeve pocket 82a, 82b, 82c and 82d has one vertical edge that is stitched to the fabric bag 12, and the other vertical edge has a connecting mechanism 84 (e.g., a hook-and-loop fastener or a strip of Velcro™) that allows the respective corner sleeve pocket 82a, 82b, 82c and 82d to be opened and closed, and to be removably secured to a corresponding connecting mechanism 85 (e.g., a hook-and-loop fastener or Velcro™ strips) provided on the side walls 80a, 80b, 80c and 80d. A fabric base (not shown) can be provided at the bottom of the side walls 80a, 80b, 80c and 80d.

A surrounding fabric lip 88 extends from the top of the side walls 80a, 80b, 80c and 80d. Opposing fastener buttons 90 are provided on the lip 88 and corresponding locations of the side walls 80a, 80b, 80c and 80d, and opposing slits 92 are provided on the lip 88 and corresponding locations of the side walls 80a, 80b, 80c and 80d. Preferably, two pairs of opposing slits 92 are provided on two opposing side walls 80b and 80d and their corresponding lip sections. In addition, two pairs of fastener buttons 90 are provided on each side wall 80a, 80b, 80c and 80d and their corresponding lip sections.

Referring to FIG. 4, the fabric bag 12 is inserted through the top frame 18 and into the interior space defined by the rear frame 40, left frame 42 and right frame 44. FIG. 5 shows the fabric bag seated inside this interior space. Next, the corner sleeve pockets 82a, 82b, 82c and 82d are opened and wrapped around the following sides: the sleeve pocket 82a is wrapped around the front side 52d of the right frame 44, the sleeve pocket 82d is wrapped around the front side 52d of the left frame 42, the sleeve pocket 82b is wrapped around the rear side 52b of the right frame 44 and the sides 46d and 50a of the rear frame 40, and the sleeve pocket 82c is wrapped around the rear side 52b of the left frame 42 and the sides 46b and 48a of the rear frame 40. As shown in FIG. 6, this results in all the sleeve pockets 82a, 82b, 82c and 82d covering all the vertical sides of the rear frame 40, left frame 42 and right frame 44. As also shown in FIG. 6, the lip 88 is folded down around the sides 58a, 58b, 58c and 58d of the top frame 18 and the top sides 46a, 48b, 50b and 52a of the rear frame 40, left frame 42 and right frame 44, and the opposing fasteners 90 are buttoned up to secure the top of the fabric bag 12 to the top frame 18 and the top sides 46a, 48b, 50b and 52a of the rear frame 40, left frame 42 and right frame 44. When the lip 88 has been folded in this manner, the corresponding slits 92 are aligned.

Figure 1:
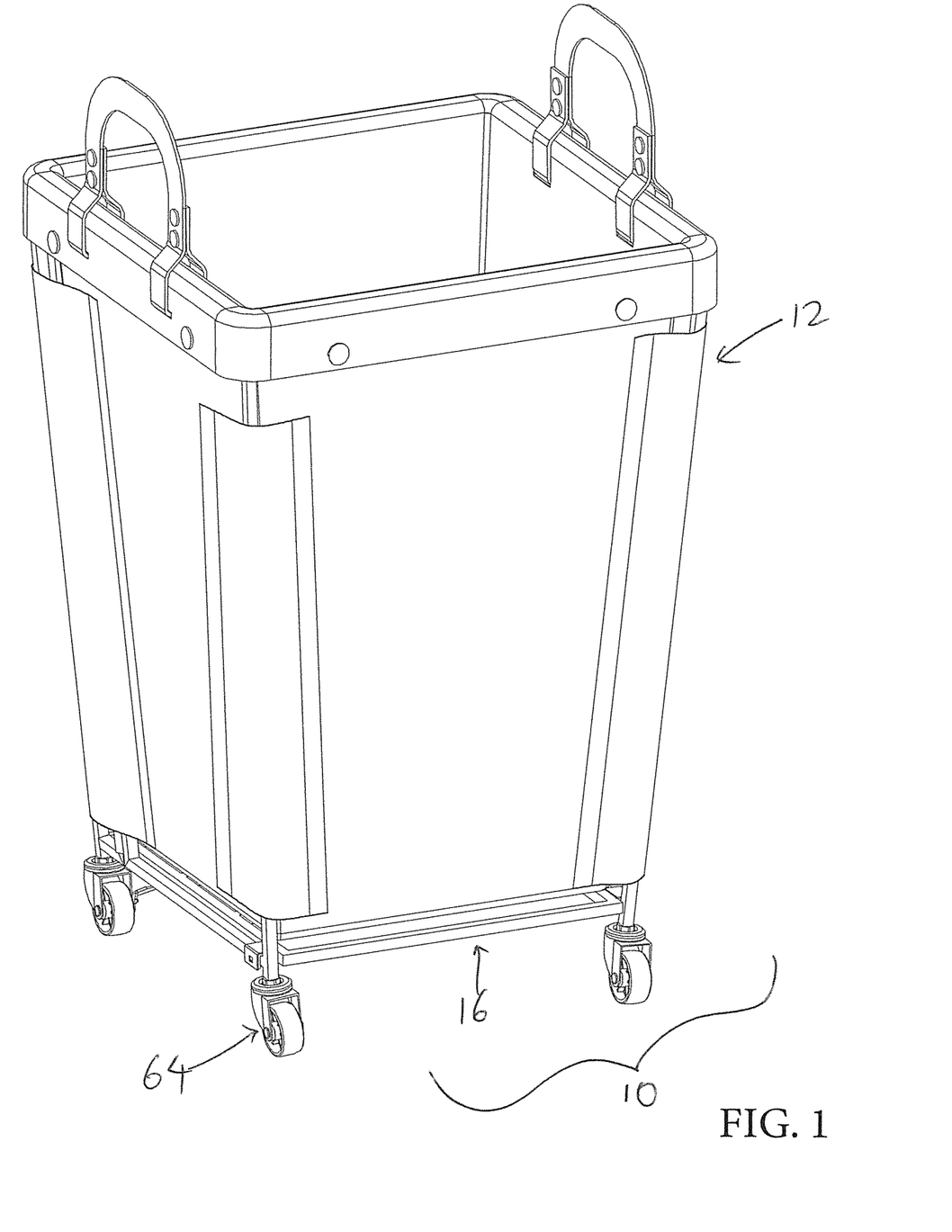
FIG. 1 is a perspective view of a hamper according to the present invention shown in an assembled configuration.
Figure 7:
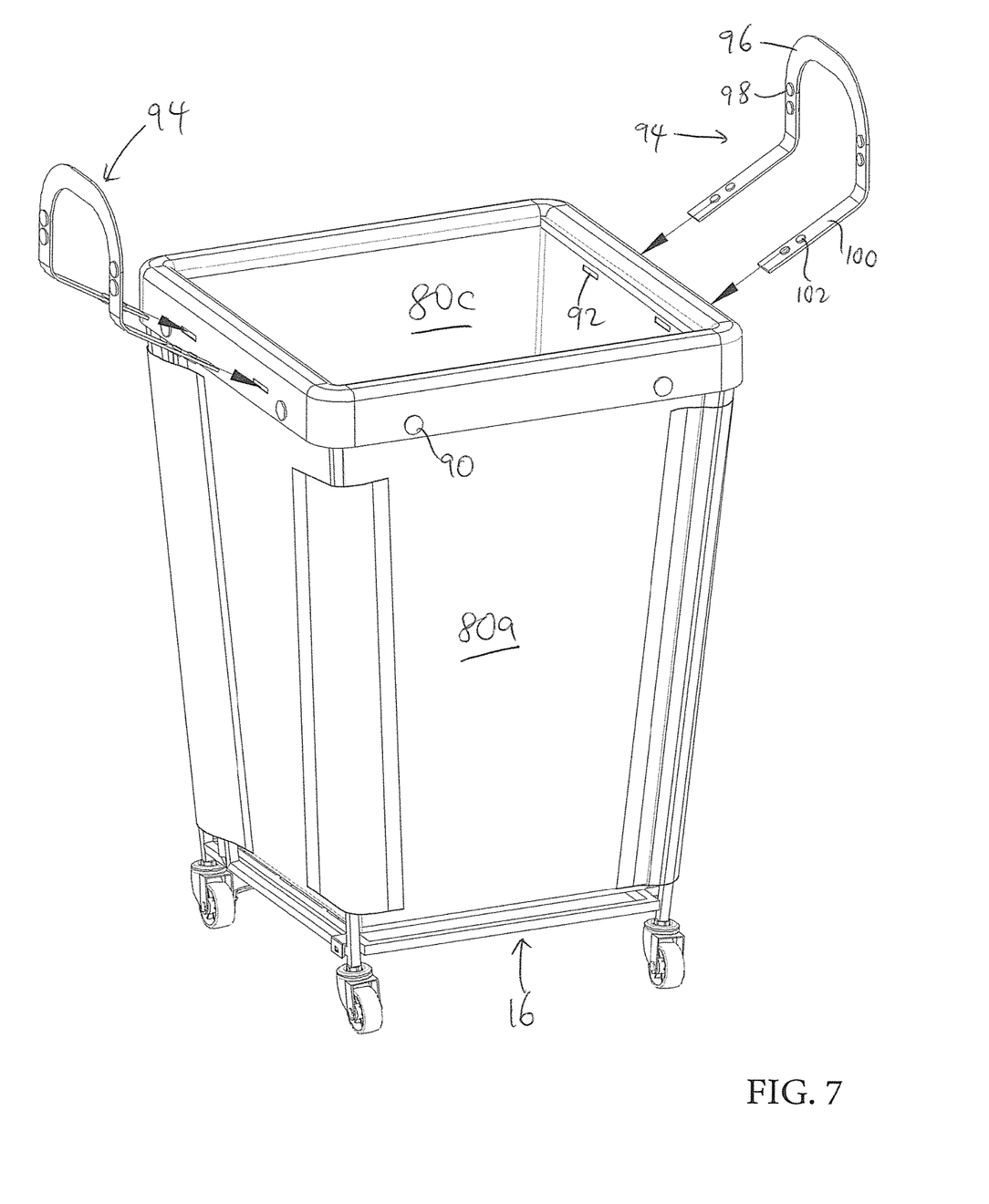
FIG. 7 illustrates how the handles are installed on the hamper of FIG. 1.

Finally, as shown in FIG. 7, the two handles 94 can be secured to the slits 92. Each handle 94 has a U-shaped section 96, with at least one fastener 98 provided on each leg of the U-shaped section 96. A straight section 100 extends from each leg of the U-shaped section 96, and a corresponding fastener 102 is provided on each straight section 100. Each straight section 100 is inserted through the aligned slits 92 and then folded back towards the corresponding leg, where the fasteners 98 and 102 are secured together to secure the handle 94 at the location of the slits 92. FIG. 1 shows the fully assembled hamper 10 ready for use.

All the frames and bars in the present invention can be provided in the form of a metallic material, such as aluminum, stainless steel, and iron. The fabric bag 12 can be provided in the form of a durable fabric material, such as a cotton polyester blend fabric. The corner sleeve pockets 82a, 82b, 82c and 82d can be provided in the same material as the fabric body 12.

As a result, the hamper 10 of the present invention has a large fabric bag 12 which can be used to hold a large quantity of laundry, including bulky laundry such as towels and bedsheets. The caster assemblies 64 allow the hamper 10 to be wheeled around conveniently. In addition, the separate components of the hamper 10 can be packaged into a thin-profile package or box that occupies minimal storage space that is important for minimizing cost and space for shipping, and for occupying minimal shelf space at retail outlets. Finally, the components of the hamper 10 can be quickly and easily assembled for use.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A hamper, comprising:
   a supporting frame assembly comprising:
      a foldable wall assembly having:
         a rear frame having a top side, a bottom side, a left side and a right side, a left extension having a vertical bar, a top bar and a bottom bar both connecting the vertical bar of the left extension and the left side of the rear frame, and a right extension having a vertical bar, a top bar and a bottom bar both connecting the vertical bar of the right extension and the right side of the rear frame;
         a left frame having a front side, a bottom side, a top side, and a rear side that is pivotably connected to the vertical bar of the left extension; and
         a right frame having a front side, a bottom side, a top side, and a rear side that is pivotably connected to the vertical bar of the right extension;
      a base having a rear side that is pivotally connected with the bottom side of the rear frame, a left side and a right side, with the left and right sides of the base removably coupled to the bottom sides of the left frame and the right frame, respectively;
      a top frame having a rear side that is removably coupled to the top side of the rear frame, the top frame also having a front side, a left side and a right side, with the left and right sides of the top frame removably coupled to the top sides of the left frame and the right frame, respectively; and
   a fabric bag having a four side walls, each side wall having an upper edge, a lip extending around the upper edge of each side wall, and four vertical corner sleeve pockets, with a first vertical corner sleeve pocket wrapped around the front side of the right frame, a second vertical corner sleeve pocket wrapped around the front side of the left frame, a third vertical corner sleeve pocket wrapped around at least the left side of the rear frame, and a fourth vertical corner sleeve pocket wrapped around at least the right side of the rear frame, and wherein the lip is folded around at least the front, left, right and rear sides of the top frame and secured to portions of the side walls.

2. The hamper of claim 1, wherein the third vertical corner sleeve pocket is also wrapped around the rear side of the left frame, and the fourth vertical corner sleeve pocket is also wrapped around the rear side of the right frame.

3. The hamper of claim 1, wherein each vertical corner sleeve pocket has a first vertical edge that is stitched to the fabric bag, and a second vertical edge that has a strip of Velcro™ that allows a respective corner sleeve pocket to be opened and closed, and to be removably secured to corresponding Velcro™ strips provided on the side walls.

4. The hamper of claim 1, wherein the hamper is configured in a storage position where the base is pivoted to be aligned against the rear frame, the right frame is pivoted to be aligned against the base and the rear frame, and the left frame is pivoted to be aligned against the right frame, the base and the rear frame.

5. The hamper of claim 1, wherein the hamper is configured in a storage position where the base is pivoted to be aligned against the rear frame, the left frame is pivoted to be aligned against the base and the rear frame, and the right frame is pivoted to be aligned against the left frame, the base and the rear frame.

6. The hamper of claim 1, wherein the left extension and the right extension have different widths.

7. The hamper of claim 6, wherein the left frame and the right frame have different widths.

8. The hamper of claim 7, wherein a combined width of the left extension and the left frame is a same as a combined width of the right extension and the right frame.

9. The hamper of claim 1, wherein the left frame and the right frame have different widths.

10. The hamper of claim 1, wherein a roller caster assembly is secured to a bottom of each of the front sides of the left and right frames, and a bottom of each of the left side and the right side of the rear frame.

11. The hamper of claim 1, wherein opposing fastener buttons are provided on the lip and corresponding locations on each of the side walls to secure the folded lip to the side walls.

12. The hamper of claim 1, wherein opposing slits are provided on the lip and corresponding locations of the side walls so that the opposing slits are aligned when the lip is folded to the side walls, the hamper further including two handles, with each handle having a U-shaped section and two legs, with at least one fastener provided on each leg of the U-shaped section, and with a straight section extending from each leg of the U-shaped section, and a corresponding fastener provided on each straight section, wherein each straight section is inserted through the aligned slits and then folded back towards a corresponding leg, where the fasteners on a each corresponding leg and straight section are secured together to secure the handle at a location of the aligned slits.

* * * * *